United States Patent
Tse et al.

(10) Patent No.: US 12,400,128 B2
(45) Date of Patent: Aug. 26, 2025

(54) DATA ENRICHMENT ON INSULATED APPLIANCES

(71) Applicant: Microsoft Technology Licensing, LLC, Redmond, WA (US)

(72) Inventors: Michael Mong-Kuan Tse, Kirkland, WA (US); Kamran Rajabi Zargahi, Seattle, WA (US); Samuel Sau Man Chan, Redmond, WA (US); Richard Jason Ortega, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 1225 days.

(21) Appl. No.: 16/407,077

(22) Filed: May 8, 2019

(65) Prior Publication Data

US 2020/0285968 A1    Sep. 10, 2020

Related U.S. Application Data

(60) Provisional application No. 62/816,019, filed on Mar. 8, 2019.

(51) Int. Cl.
| | |
|---|---|
| *G06N 5/022* | (2023.01) |
| *G06F 16/903* | (2019.01) |
| *G06N 5/046* | (2023.01) |
| *G06V 40/16* | (2022.01) |
| *G10L 15/26* | (2006.01) |

(52) U.S. Cl.
CPC ....... *G06N 5/022* (2013.01); *G06F 16/90335* (2019.01); *G06N 5/046* (2013.01); *G06V 40/172* (2022.01); *G10L 15/26* (2013.01)

(58) Field of Classification Search
CPC .......... G06N 5/022; H04L 67/10; H04W 4/70
See application file for complete search history.

(56) References Cited

U.S. PATENT DOCUMENTS

| | | | |
|---|---|---|---|
| 9,171,008 B2 * | 10/2015 | Prahlad | G06F 16/41 |
| 10,593,174 B1 * | 3/2020 | Yoon | H04L 12/2816 |
| 10,958,958 B2 * | 3/2021 | Hardee | H04N 21/2665 |

(Continued)

OTHER PUBLICATIONS

Atheide et al; Atheide, "File Analysis—Chapter 8," Digital Forensics with Open Source Tools, p. 1 (Year: 2011).*

(Continued)

*Primary Examiner* — Michael J Huntley
*Assistant Examiner* — Paul J Breene
(74) *Attorney, Agent, or Firm* — Foley IP Law, PLLC

(57) ABSTRACT

Aspects and examples disclosed herein are directed to data enrichment on insulated appliances. An appliance for performing knowledge mining in a disconnected state is operative to: ingest data of a first type from a first data source coupled to the appliance; enrich at least a first portion of the ingested data, when in the disconnected state, with at least one of the cognitive functions of the plurality of containerized cognitive functions; identify at least a second portion of the ingested data for enrichment by a cognitive function that is not within the plurality of containerized cognitive functions; store the enriched data in an index; triage the ingested data and the enriched data in the index for uploading; upload the triaged data when reconnected to a network; and import an updated plurality of containerized cognitive functions when reconnected.

20 Claims, 10 Drawing Sheets

(56) References Cited

U.S. PATENT DOCUMENTS

| | | | | |
|---|---|---|---|---|
| 11,616,839 | B2* | 3/2023 | Sharma | H04L 67/34 |
| | | | | 706/12 |
| 2015/0356428 | A1 | 12/2015 | Sanchez et al. | |
| 2017/0060574 | A1 | 3/2017 | Malladi et al. | |
| 2018/0349514 | A1* | 12/2018 | Alzate Perez | G06F 16/90332 |
| 2018/0365820 | A1 | 12/2018 | Nipe et al. | |
| 2019/0045346 | A1* | 2/2019 | Macieira | H04W 72/02 |
| 2020/0285967 | A1 | 9/2020 | Tse et al. | |

OTHER PUBLICATIONS

"Cognition—Wikipedia," p. 1 (Year: 2019).*
"What Is Computer Vision," Microsoft Azure (Year: 2018).*
"Enrich Definition," Merriam-Webster (Year: 2020).*
"Triage Definition," Merriam-Webster (Year: 2020).*
"What is a Cloud Gateway," Medium, Click2Cloud, Inc (Year: 2021).*
"Chapter 8—File Analysis," Digital Forensics with Open Source Tools, Atheide et al. (Year: 2011).*
"International Search Report and Written Opinion Issued in PCT Application No. PCT/US2020/019823", Mailed Date: May 7, 2020, 13 Pages.
"International Search Report and Written Opinion Issued in PCT Application No. PCT/US2020/019735", Mailed Date: May 7, 2020, 14 Pages.
"Notice of Allowance Issued in European Patent Application No. 20713141.8", Mailed Date: Jul. 27, 2023, 2 Pages.
"Notice of Allowance Issued in European Patent Application No. 20714387.6", Mailed Date: Jul. 13, 2023, 2 Pages.
"Final Office Action Issued in U.S. Appl. No. 16/407,061", Mailed Date: Aug. 25, 2023, 33 Pages.
"Extended Search Report Issued in European Patent Application No. 23185437.3", Mailed Date: Aug. 23, 2023, 9 Pages.
Atheide, et al., "Digital Forensics with Open Source Tools", Retrieved From: https://www.sciencedirect.com/book/9781597495868/digital-forensics-with-open-source-tools, 2011, 1 Page.
"Extended European Search Report Issued in Application No. 23187351.4", Mailed Date: Aug. 30, 2023, 10 Pages.
"Cognition", Retrieved from: https://web.archive.org/web/20190116043412/https://en.wikipedia.org/wiki/Cognition, Jan. 15, 2019, 7 Pages.
"Knowledge Mining," Microsoft Azure (Year: 2021).
"Pointers," Wikipedia (Year: 2019).
Communication pursuant of Rule 70a(2)&R.70(2) Received in European Patent Application No. 23185437.3, mailed on Sep. 25, 2023, 9 pages.
Final Office Action issued in U.S. Appl. No. 16/407,061, mailed on Sep. 5, 2024, 41 Pages.
Non-Final Office Action mailed on Feb. 8, 2024, in U.S. Appl. No. 16/407,061, 35 pages.
Communication pursuant to Article 94(3) received in European Application No. 23187351.4, mailed on Mar. 7, 2025, 8 pages.
Communication Pursuant to Rule 94 (3) Received for European Application No. 23185437.3, mailed on Feb. 20, 2025, 06 pages.
"Notice of Allowance Issued in European Patent Application No. 20713141.8", Mailed Date: Mar. 22, 2023, 8 Pages.
"Non Final Office Action Issued In U.S. Appl. No. 16/407,061", Mailed Date: Mar. 22, 2023, 36 Pages.
"Notice of Allowance Issued in European Patent Application No. 20714387.6", Mailed Date: Mar. 9, 2023, 7 Pages.

\* cited by examiner

DATA ENRICHMENT ON INSULATED APPLIANCES

BACKGROUND

Many organizations have accumulated significant data repositories in the cloud, which can be leveraged for value. The concept of extracting intelligence from large unstructured and disparate data sets is often referred to as knowledge discovery in data (KDD). Using cognitive search capabilities, data can be quickly ingested and enriched, so that insights can be surfaced to analysts, information workers, and leadership. This can maximize value extraction from the accumulated data, although it requires bringing data to the cloud environment.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to data enrichment on insulated appliances. An example appliance for performing knowledge mining in a disconnected state is operative to: ingest data of a first type from a first data source coupled to the appliance; enrich at least a first portion of the ingested data, when in the disconnected state, with at least one of the cognitive functions of the plurality of containerized cognitive functions; identify at least a second portion of the ingested data for enrichment by a cognitive function that is not within the plurality of containerized cognitive functions; store the enriched data in an index; triage the ingested data and the enriched data in the index for uploading; upload the triaged data when reconnected to a network; and import an updated plurality of containerized cognitive functions when reconnected.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Many organizations have vast, disjoint, and inaccessible data repositories, as well as an increasing need to manage an exponentially increasing inflow of data. As part of digital transformations, organizations often evaluate the benefits of moving data to the cloud, look for ways to better utilize the data they have in the cloud, and contemplate solutions that move intelligence to the where the data lives and/or is being collected. A strong value proposition for such organizations is rapidly unlocking the latent intelligence value that resides within data.

The concept of extracting intelligence from large unstructured and disparate data sets is often referred to as knowledge discovery in data (KDD). Using a cognitive search service, which includes cognitive services enrichments (e.g. computer vision (CV), translation, text analytics, face API (e.g., facial recognition), speech recognition, and others), data can be quickly ingested, enriched, and insights surfaced to analysts, information workers, and leadership to help with investigative and mission scenarios. Customizable processing pipelines empower data consumers to continually evolve knowledge extraction pipelines and scale solutions. On the edge, services can be packaged as docker container images to be run on internet of things (IoT) edge devices, although in some examples containers use other software packages. In some examples, containers run on non-IoT computing hardware. By bringing the knowledge extraction capabilities to the edge, data consumers can (1) gain insights on their data faster, (2) have a triage mechanism to surface high value information to the appropriate personnel, and (3) have a triage mechanism to prioritize data to be sent for further processing either on the edge or in the cloud. Continuous learning in KDD improves quality and availability of enrichments that can be leveraged in the processing pipeline in the cloud and on the edge.

Figure 1:
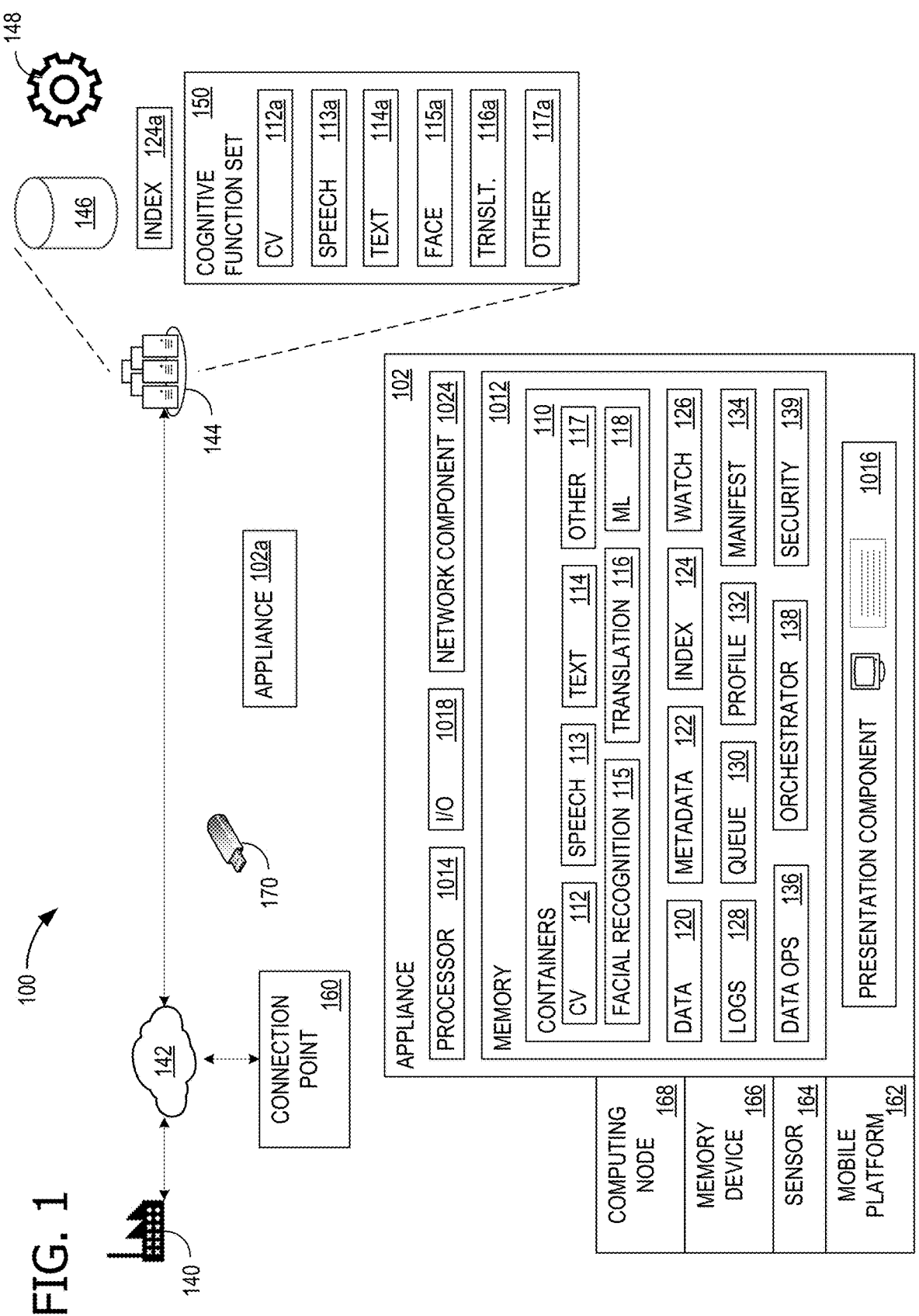
FIG. 1 illustrates an environment for advantageously employing data enrichment on insulated appliances.

FIG. 1 illustrates an environment 100 for advantageously employing data enrichment on insulated appliances 102 and 102a, which operate on the edge, without internet connectivity. As illustrated, appliance 102 includes a memory 1012, a processor 1014, a presentation component 1016, input/output (I/O) ports 1018, and a network component 1024. Some examples of appliance are realized as a computing device 1000, which is described in more detail in relation to FIG. 10.

Although knowledge mining and cognitive search operations are performed in cloud environments (for example, by leveraging cognitive services as skills) to enrich data, appliance 102 enables knowledge mining in a disconnected state. That is, rather than bringing data to cognitive functionality, appliance 102 brings cognitive functionality to the location of the data. Appliance 102 can operate in an isolated environment, without internet connectivity, in an internet-disconnected experience. Some examples of appliance 102 are accessed via local network and console web applications. Appliance 102 ingests discovered materials into a data store 120, extracts metadata 122 into an index 124, and uses a preloaded watch list 126 (a tip list) for tipping and cueing data. Cognitive functions run locally via containers 110. A container image is a lightweight, standalone, executable package of software that includes components needed to run an application: code, runtime, system tools, system libraries and settings. In some examples, containers 100 are Docker containers. In some examples, containers 100 use other software packages.

The illustrated containerized cognitive functions include computer vision (CV) 112, speech processing 113, text analytics 114, facial processing 115, translation 116, and other functions 117. In some examples, CV 112 includes optical character recognition (OCR). In some examples, speech processing 113 includes speech detection, recognition, transcription, and other language processing. In some examples, text analytics 114 includes contextual analysis, extracting entities, and language detection. In some examples, facial processing 115 includes detection and recognition. These cognitive functions include machine learning (ML) models, generated by artificial intelligence (AI) training. For example, CV 112 uses a vision model, speech processing 113 is built on audio and language models, and translation 116 is built on text and language models. The purposes of cognitive functions are to enrich and extract meaningful information from available data. Enriching data improves its utility, for example, digitizing an image, recognizing objects within a digital image, translating text, and converting audio signals into textual data. In some examples, enriching data includes extracting and generating metadata for a file, and/or extracting objects within a file (e.g., facial recognition, or other object identification, detection, or recognition). In some examples, other functions 117 includes functions that, although they may be classified as cognitive functions, are not associated with human cognitive functions. Examples include anomaly detection, clustering, and other ML-enabled data analytics.

Some examples of appliance 102 are mobile, for example, using a mobile platform 162. In operation, appliance 102 ingests data found in the field and loaded onto appliance 102 (e.g., sensor data from a sensor 164 or a memory device 166) or data in an adjacent computing node 168 and stores it in data store 120. Together, sensor 164, memory device 166, and computing node 168 are data sources for appliance 102. Metadata 122 is extracted and stored in index 124. In some examples, index 124 includes textual information. In some examples, index 124 includes JavaScript Object Notation (JSON) formatted data. JSON is a language-independent data format that uses text to transmit data objects consisting of attribute-value pairs and array data types, or any other serializable value, useable for asynchronous browser-server communication. Watch list 126 is referenced when monitoring metadata 122 to trigger extraction and queuing of data for offloading or other operations.

Log data 128 records operation results and, in some examples, records data operation failures that are used to identify needed functionality that should be loaded (if available) or built. For example, appliance 102 identifies at least a portion of the ingested data for enrichment by a cognitive function that is not within the plurality of containerized cognitive functions already on-board appliance 102. A queue 130 is the prioritized list of information that is to be uploaded when appliance 102 has connectivity. A communication profile 132 controls network component 1024 to either run silent with no emissions (e.g., shut off network connectivity attempts, including WiFi) or else attempt network connections under defined conditions. For example, communication profile 132 can detect a new connection and limit access by appliance 102 other nodes based on their credentials, and manually initiate synchronization, including uploading data (according to queue 130) and downloading data and needed functionality. In some examples, communication profile 132 limits telemetry, "phone home" attempts, data logging, and scoring based on operational needs. Operational needs may require complete silence until a manual intervention triggers network connectivity attempts, or other operational limits on attempts (e.g., frequency, time, location). A manifest 134 records the specific cognitive functions in containers 110 to assist with interpretation of index 124. For example, containers 110 may be missing the best functionality for a particular data type, and so index 124 may have gaps. By keeping track of which cognitive functions are on appliance 102, gaps in index 124 can be better understood. A data operations component 136 explores and enriches index 124, updates watch list 126, and extracts data from data store 120. Data operations component 136 is described in more detail in relation to FIG. 2, along with an orchestrator 138.

Environment 100 also includes a production facility 140, where appliance is provisioned (pre-loaded) with a cognitive function set 150 from a cloud service node 144 accessed over a network 142. In some examples, cognitive function set 150 includes third party cognitive functions (skills). In some examples, cloud service node 144 is a logical node that is distributed among a plurality of physically disparate nodes. In some examples, appliance 102 is loaded with a seed index 124a (which becomes index 124), watch list 126, communication profile 132, and manifest 134, along with data operations component 136 and orchestrator 138. Cloud service node 144 includes its own data store 146, which is used by AI training component 148 to build cognitive function set 150. Cognitive function set 150 has CV 112a, speech processing 113a, text analytics 114a, facial processing 115a, translation 116a, and other functions 117a. Initially, CV 112, speech processing 113, text analytics 114, facial processing 115, translation 116, and other functions 117 are the same as CV 112a, speech processing 113a, text analytics 114a, facial processing 115a, translation 116a, and other functions 117a. However, when appliance 102 disconnects from cloud service node 144, CV 112a, speech processing 113a, text analytics 114a, facial processing 115a, translation 116a, and other functions 117a are subject to continued training by AI training component 148, whereas CV 112, speech processing 113, text analytics 114, facial processing 115, translation 116, and other functions 117 either remain static or are trained by different data in data store 120. In some examples, data stores 146 and 120 contain synthetic data, and ML models are trained using synthetic data.

After appliance 102 leaves production facility 140, over time, CV 112, speech processing 113, text analytics 114, facial processing 115, translation 116, and other functions 117 can potentially diverge from CV 112a, speech processing 113a, text analytics 114a, facial processing 115a, translation 116a, and other functions 117a, requiring updating. Updating can occur in multiple ways. Appliance 102 can connect to a connection point 160, if it has the proper credentials, as determined by a security component 139. This provides a pathway for appliance 102 to reconnect with cloud service node 144. Alternatively, a portable function repository 170 can bring a newer version of CV 112a, speech processing 113a, text analytics 114a, facial processing 115a, translation 116a, and other functions 117a to appliance 102 for side loading.

Figure 2:
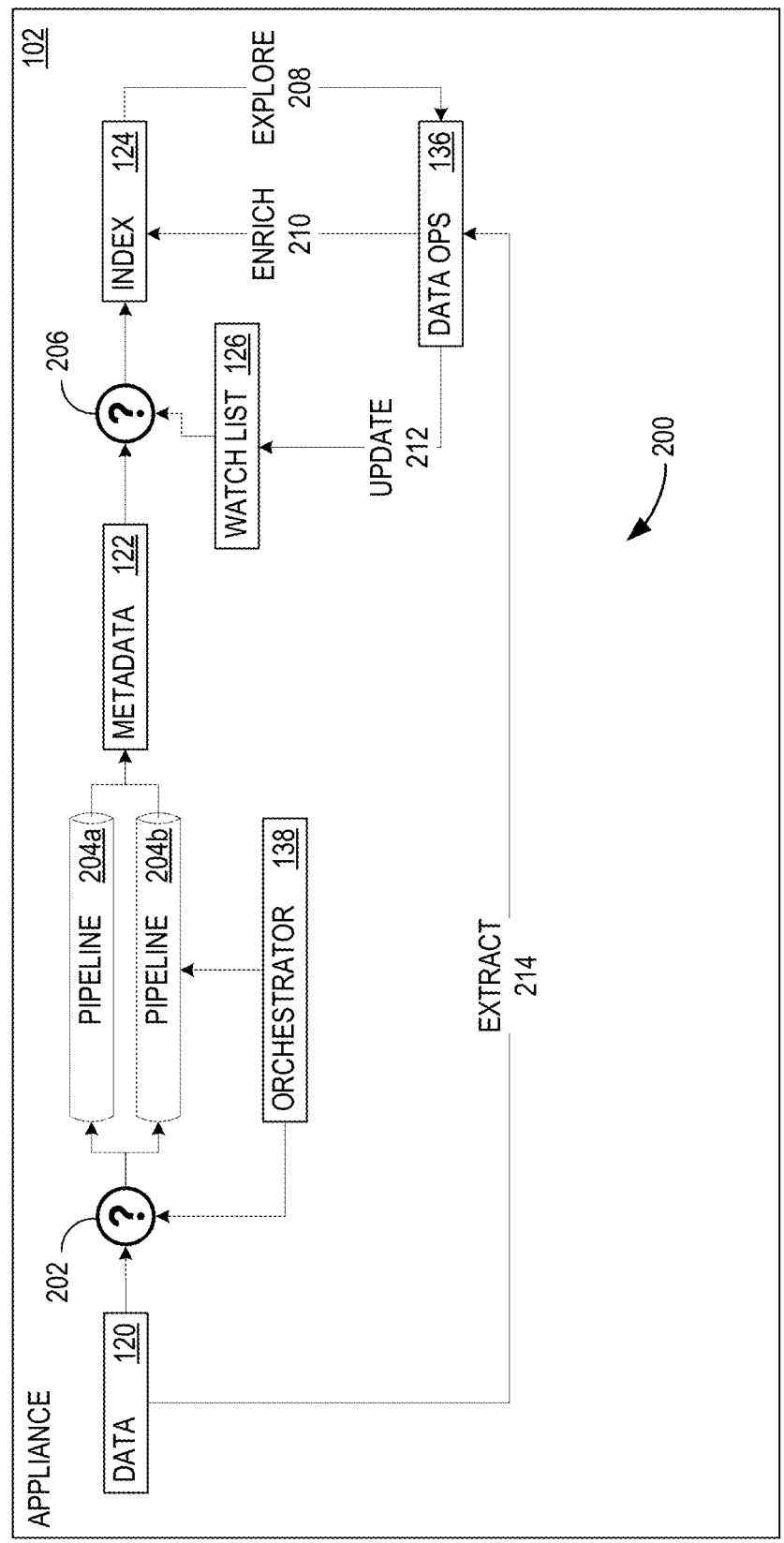
FIG. 2 shows a process flow for enriching data on an insulated appliance.

And as another option, appliance 102 can connect with another appliance, specifically appliance 102a. In some scenarios, appliance 102a has a more recent version of CV 112a, speech processing 113a, text analytics 114a, facial processing 115a, translation 116a, and other functions 117a, and so appliance 102 an update its own CV 112, speech processing 113, text analytics 114, facial processing 115, translation 116, and other functions 117. In some scenarios, appliance 102a has been in-place and operating in some environment and appliance 102 is new to that environment. For example, appliance 102 communicates with appliance 102a to import or export data or a cognitive function. Thus, appliance 102 connects to appliance 102a to merge data stores and indexes to share learning and enrichment. This is possible when appliance 102 and appliance 102a have the same index schema, but which are populated differently. This permits appliance 102 to benefit from richer data on appliance 102a, due to the operations history of appliance 102a. The illustrated example of appliance 102 further includes an AI/ML component (ML component 118) that permits on-device machine learning in support of data enrichment. In some examples, ML models can be trained using synthetic data even when appliance 102 is in a disconnected state;

FIG. 2 shows a process flow 200 for enriching data on insulated appliance 102. Although containers 110 includes ML-based cognitive skills for running analytics, some functions in containers 110 perform simpler, non-ML tasks such as build log data 128 and identifying a file type in data store 120 to identify which of CV 112, speech processing 113, text analytics 114, facial processing 115, translation 116, and other functions 117 are relevant. That is, appliance 102 can automatically select from available cognitive functions to apply to data, based upon mission needs and file or data type. In the illustrated example of FIG. 2, a data ID function 202 selects from among two available cognitive function pipelines 204a and 204b for processing a file in data store 120, under the control of orchestrator 138. Each of cognitive function pipelines 204a and 204b is a stack of cognitive functions (e.g., a plurality of cognitive functions) and can include multiple ones of CV 112, speech processing 113, text analytics 114, facial processing 115, translation 116, and other functions 117. In some examples, at least one of cognitive function pipelines 204a and 204b includes a plurality of cognitive functions. In some examples, at least one of cognitive function pipelines 204a and 204b includes at least one cognitive function that is not within the other. Thus, appliance 102 is operable to enrich at least a first portion of the ingested data, when in the disconnected state, with at least one of the cognitive functions of the plurality of containerized cognitive functions. Although two pipelines are illustrated, it should be understood that a different number is used in some examples.

The output of cognitive function pipelines 204a and 204b is metadata 122, which will be entered into index 124. As illustrated, a review function 206 applies watch list 126 to metadata 122 to search for the appearance of particular data, such as keywords. In some examples, watch list 126 items act as triggers for metadata 122 inference results, resulting in a preview of a file in data store 120. Although review function 206 is illustrated as checking metadata 122 against watch list 126 as metadata 122 is being passed to index 124, it should be understood that review function 206 also can check metadata 122 after it has already been entered into index 124. In general, index 124 includes pointers to particular files (corresponding to specific metadata) within data store 120. In some examples, index 124 starts as a seed index (loaded as seed index 124a) with the initial provisioning of appliance 102 and grows as further metadata 122 is generated and/or appliance 102 connects to other appliance 102a for merging of data. Eventually, index 124 is consumed by users, for example by being searched. A search hit in index 124 will return a pointer to files in data store 120. Searches within index 124 can retrieve data on entity relationships and files with identified sets of terms, the number of occurrences of the terms, time range, or geographical locations, and other criteria.

Data operations component 136 explores 208 index 124, for example using watch list 126, or other criteria, and upon a successful search hit, extracts 214 the relevant file from data store 120 using pointer information from index 124. Some examples of appliance 102 have on-board machine learning capability (e.g., ML component 118) which permits further enrichment 210 of index 124 (e.g., layering understanding on top of data, extracting additional metadata 122 from files to understand what is useful in those file, and uses the extracted additional metadata 122 to further fill index 124. That is, based at least on knowledge extracted from the enriched data, appliance 102 further enriches the enriched data, thereby grow what had been a seed index into an enhanced index 124 with the enriched data. Some examples bring a contextual model to index 124 to identify patterns of terms, which is a form of language understanding. This permits building more knowledge into index 124. Additionally, watch list 126 can be tuned by updating 212 terms for watch list 126. This permits an initially-loaded list to grow with use of appliance 102. In some examples, watch list 126 has both a broad set of items to seek, as well as a mission-focused tip-list with more narrowly-tailored items. As an example of operations, a particular operation may include facial detection. Thus, as appliance is bringing in data from sensor 164, and storing it in data store 120, data ID function 202 selects from a cognitive function pipeline 204a or 204b that includes facial processing 115. Review function 206 applies watch list 126 to metadata 122 to ascertain whether a face in watch list 126 has been imaged by sensor 164 on appliance 102. During this operation, both data store 120 and watch list 126 can both grow.

Figure 3:
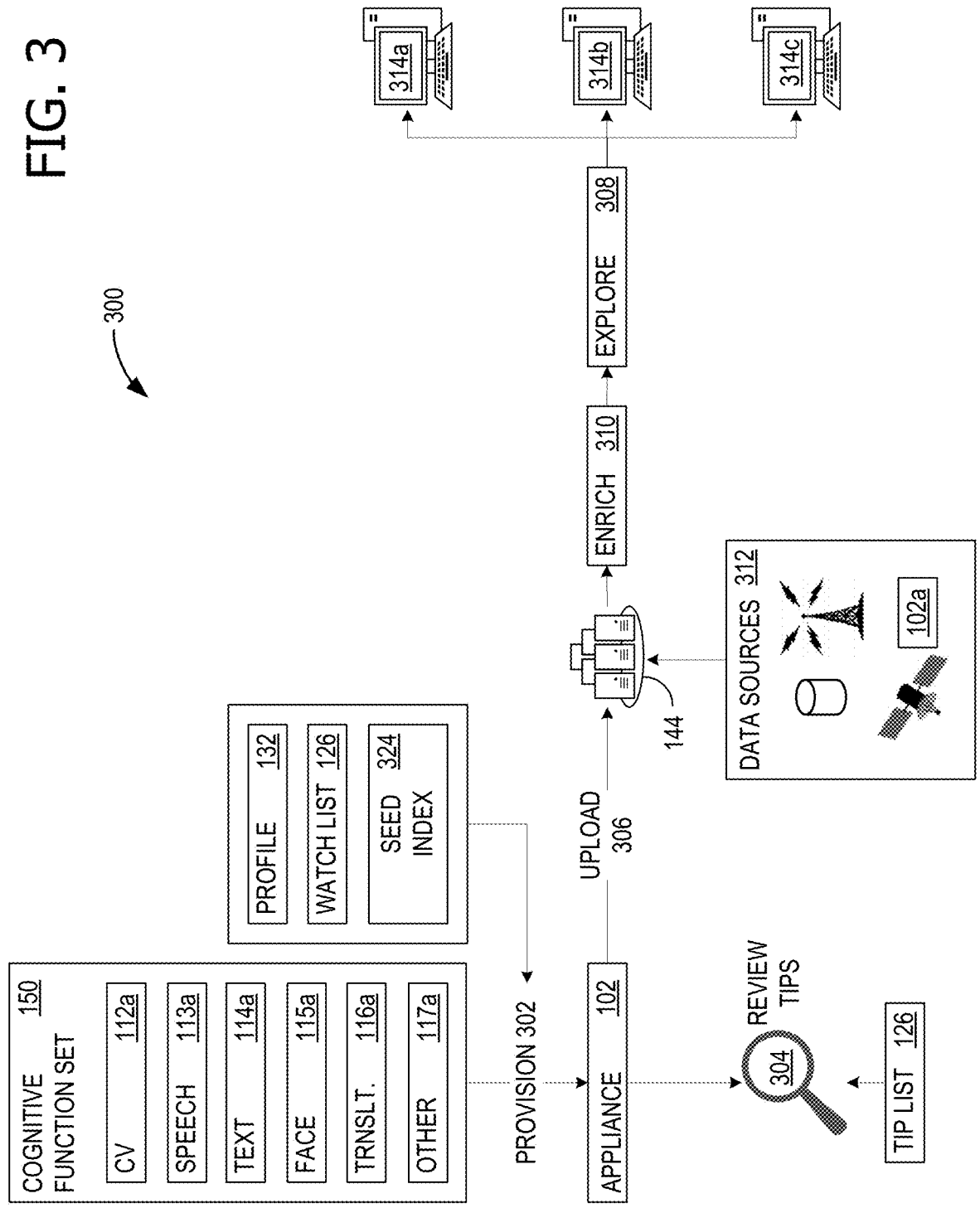
FIG. 3 illustrates knowledge mining in isolated and cloud environments.

FIG. 3 illustrates a knowledge mining process flow 300 in isolated and cloud environments. Appliance 102 has the capability to run either silent or network-connected. Upon initial provisioning 302 (configuration), an initial set of functions is deployed to appliance 102. Over time, either through reconnecting to cloud service node 144 over network 142, side loading from portable function repository 170, or merging with other appliance 102a, the set of deployed functions can change, either growing, updating, or even reducing. FIG. 3 illustrates the scenario that, although appliance 102 can perform an on-board review tips operation 304, using watch list 126, appliance 102 can also upload 306 data to cloud service node 144 for consumption by downstream users 314a, 314b, and 314c. As illustrated, cloud service node 144 also imports data from other data sources 312, enriches 310, and explores 308 data for the benefit of users 314a, 314b, and 314c. As appliance 102 is connected to cloud service node 144, it is also able to be configured (provisioned 302) with newer versions of cognitive function set 150. In some examples, the cognitive functions are updated of cognitive function set 150 while appliance 102 is disconnected from cloud service node 144. In some examples, the cognitive functions, additional or substitute cognitive functions are downloaded. The selected set of cognitive function set 150 will match upcoming mission needs, which are also coordinated with newly-loaded communication profile 132, watch list 126, and seed index 324 (which becomes index 124).

Figure 4:
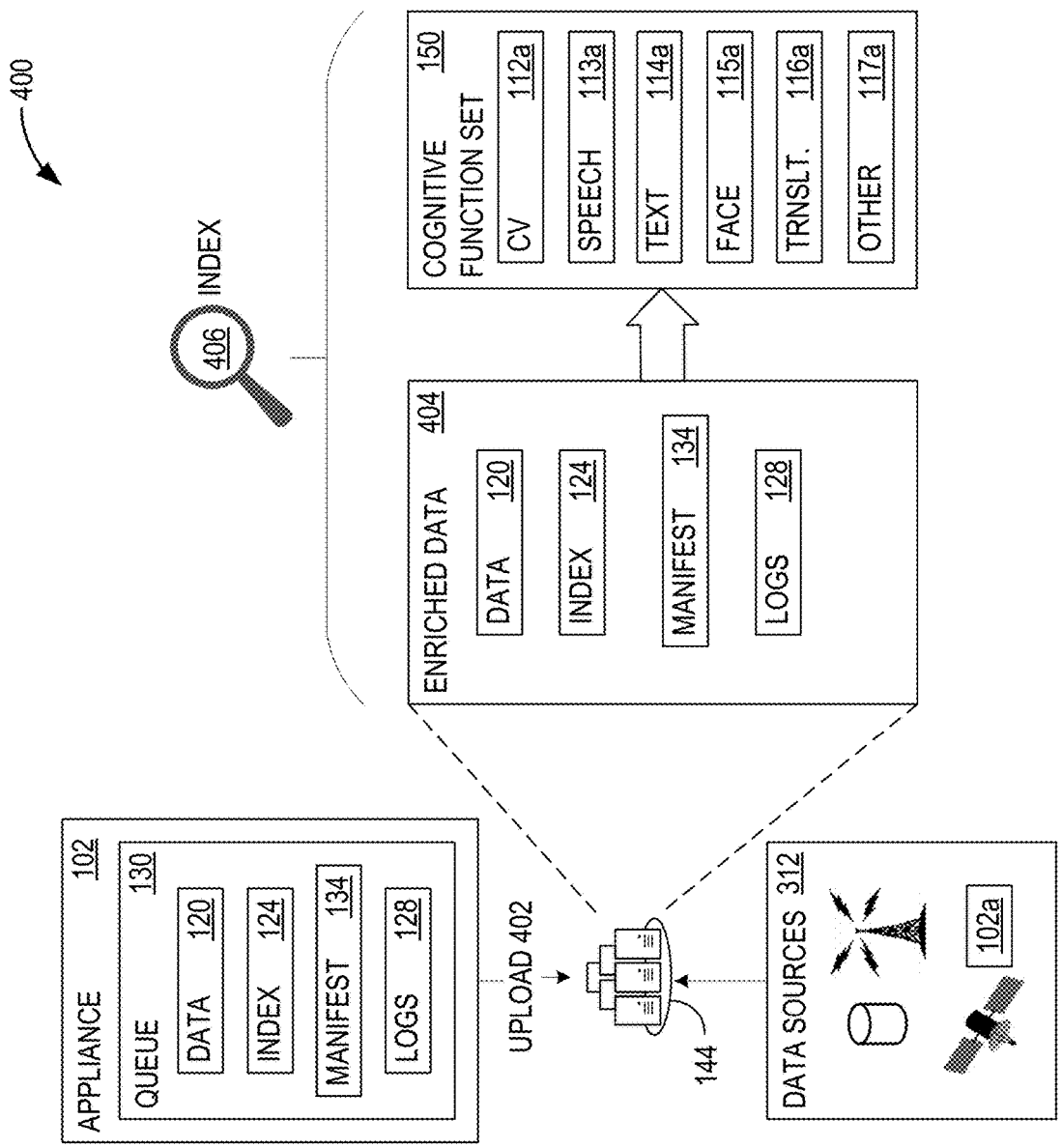
FIG. 4 illustrates indexing in a cloud environment.

FIG. 4 illustrates indexing in a cloud environment 400, and also demonstrates the bi-directional aspect of appliance 102's operations. During insulated operation (e.g., no internet connectivity), it is possible that some data ingested by appliance 102 could not be processed. These failures are documented in log data 128 for uploading 402 to cloud service node 144. In some examples, log data 128 can trigger a request for new cognitive functionality. Manifest 134 is also uploaded to cloud service node 144 to explain the failures documented in log data 128 and gaps in index 124. Other information is also uploaded, in some examples, for example watch list 126 can explain gaps in index 124 if certain terms were not included in watch list 126. This constitutes a closed feedback loop for the disclosed data enrichment on insulated appliances.

Data store 120 is also uploaded to cloud service node 144. To permit best operation in potentially unreliable connectivity situations, data is triaged using queue 130. That is the items to be uploaded are prioritized and uploaded according to priority. This way, the most important information is uploaded first, in the event that insufficient time is available to upload everything. In general, data triage classifies data into storage queues (e.g., what to delete, what to prioritize for first upload when connection is present, what merits an alert for review). As illustrated, an index search operation 406 uses enriched data 404 with cognitive function set 150 to perform in indexing on cloud service node 144.

Figure 5:
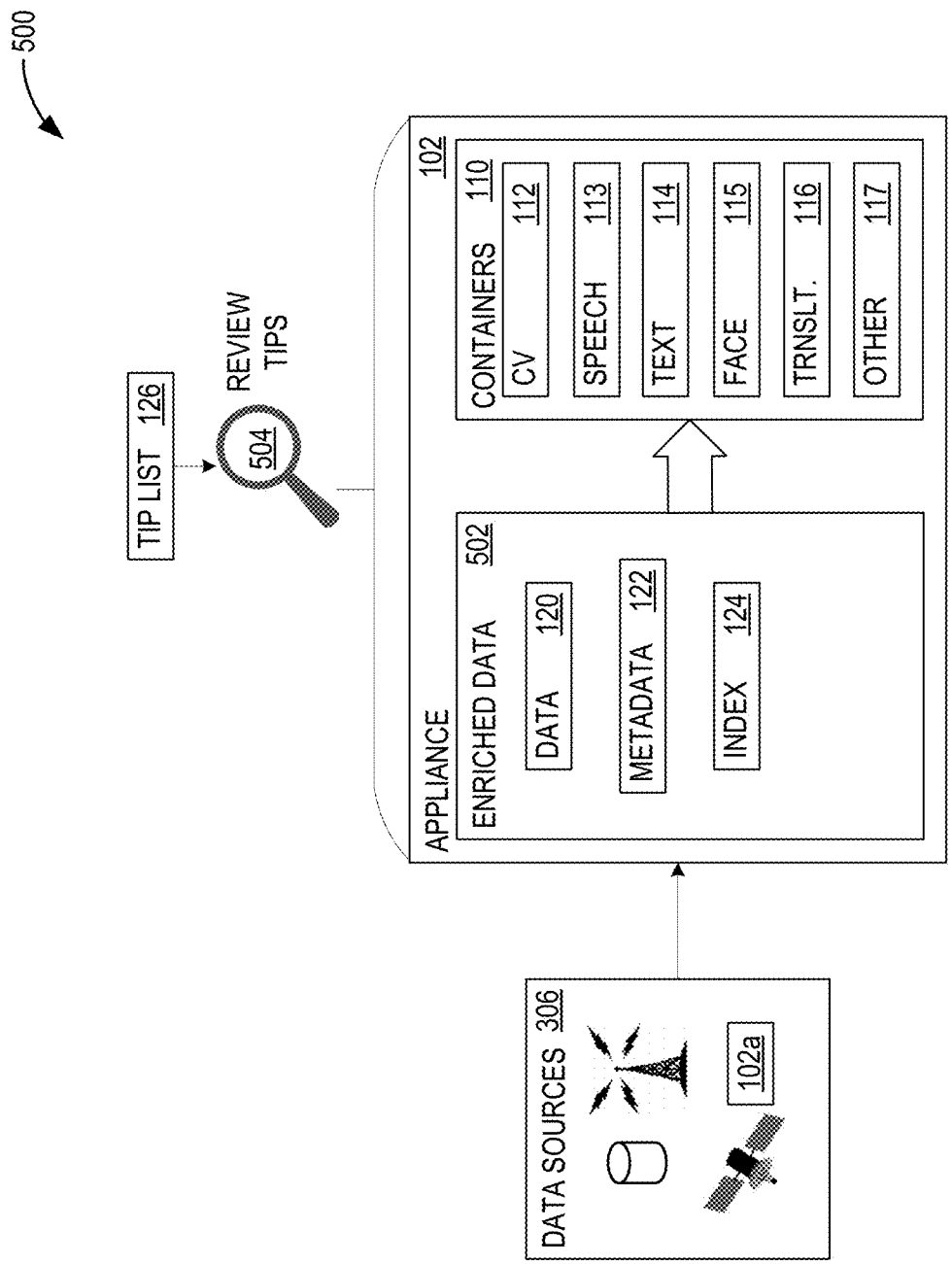
FIG. 5 illustrates tipping and queuing in an isolated environment.

FIG. 5 illustrates tipping and queuing in an isolated environment 500, o appliance 102 when appliance 102 is in an isolated state. In this illustrated scenario, rather than other data sources 312 being brought to (e.g., piped to) cloud service node 144, appliance 102 is instead brought to where other data sources 312 are available. Here, enriched data 502, which includes data store 120, metadata 122, and index 124 is processed by containers 110, on-board appliance 102, with a review tips operation 504 using watch list 126.

Figure 6:
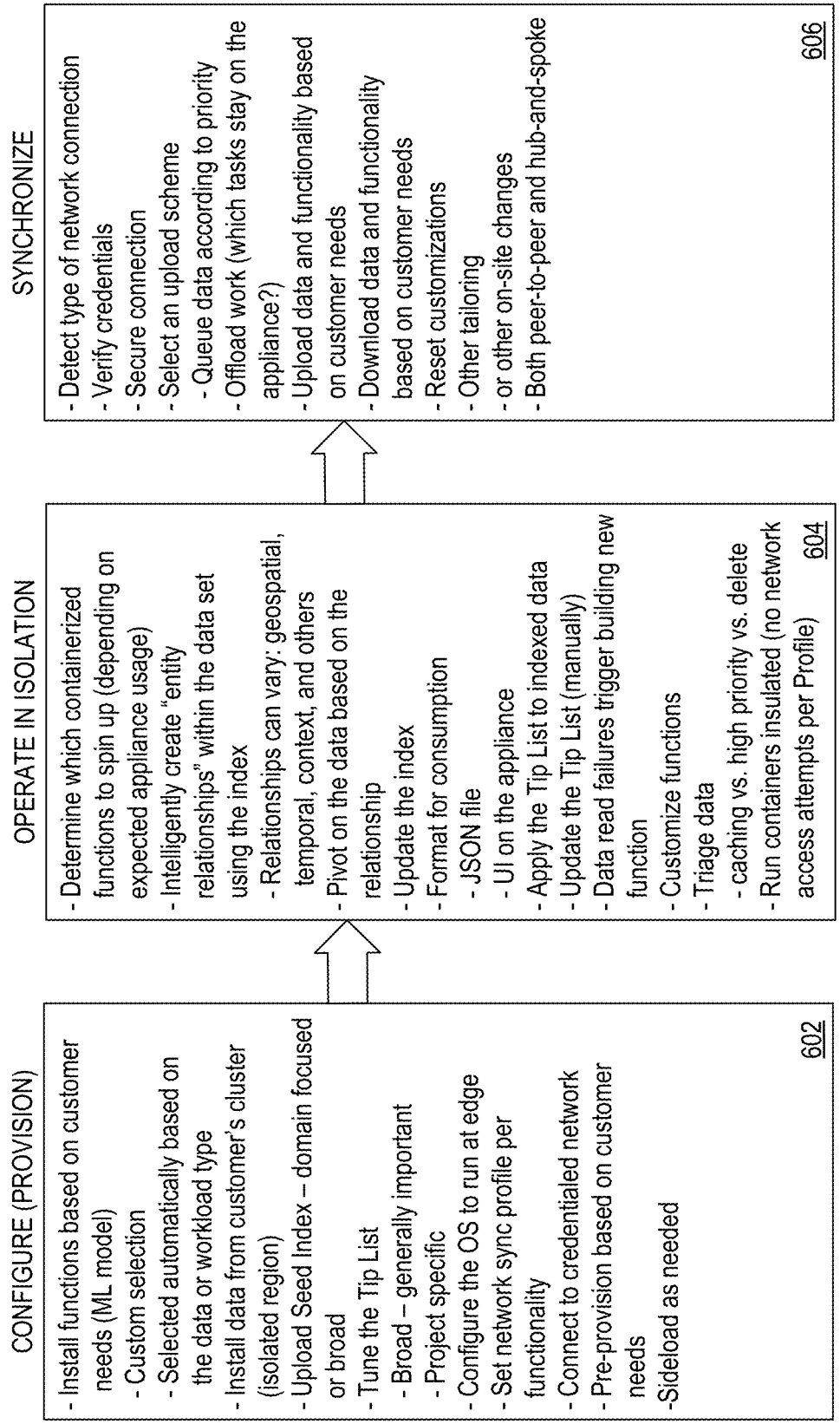
FIG. 6 shows appliance functionality in various scenarios.

FIG. 6 shows functionality of appliance 102 in various scenarios. Scenario 602 is configuration (provision, including initial and later provisioning). During scenario 602, cognitive functions are installed based on customer needs when appliance 102 is connected to a properly-credentialed network and/or endpoint. This can include custom selection by a customer/user or automatic selection, based on the expected data or workload type. In some examples, data is installed from the customer's data cluster, based on the access rights to that data. In some examples, this includes installing data and functionality from an isolated source. A seed index is loaded, which can be focused or broad, or both. The tip list is tuned, which is generally important for broad terms, and can include project specific tuning. The operating system (OS) is tuned to run as the edge, for example by loading communication profile 132 to limit network connectivity attempts. The network synchronization filter is set according to the functionality. This permits provisioning (configuration) based on customer needs, so that appliance 102 is able to operate in isolation.

And, in scenario 604, appliance 102 does operate in isolation. Containerized functions are selected to spin up based on expected usage. And entity relationships are intelligently created within the data using index 124. Relationships can vary, and can include geospatial location, temporal relationships, context, and others. The index is updated and formatted for consumption, in some examples using a JSON file, and in some examples, using a user interface (UI) on appliance 102. Watch list 126 is applied to indexed data and updated. Data read failures are logged and can trigger building new functions and/or customization of functions on appliance 102. Data is triaged, for example according to cache versus prioritize versus delete, or another scheme. Containers 110 are run in an insulated manner, with no network access attempts.

When appliance 102 is re-connected to cloud service node 144, scenario 606 is the synchronization of the data between appliance 102 and cloud service node 144. The type of network connection is detected, and credentials are verified. A secure connection is attained, in some examples, and an upload scheme is selected to queue data (e.g., according to queue 130). Data is uploaded, for example to offload some work, while other work remains on appliance 102. Functionality, data, and customizations are uploaded and/or downloaded according to customer needs. Other tailoring is also possible. Synchronization can be either peer-to-peer (appliance 102 and other appliance 102a) or hub-and-spoke (cloud service node 144 and appliance 102).

Figure 7:
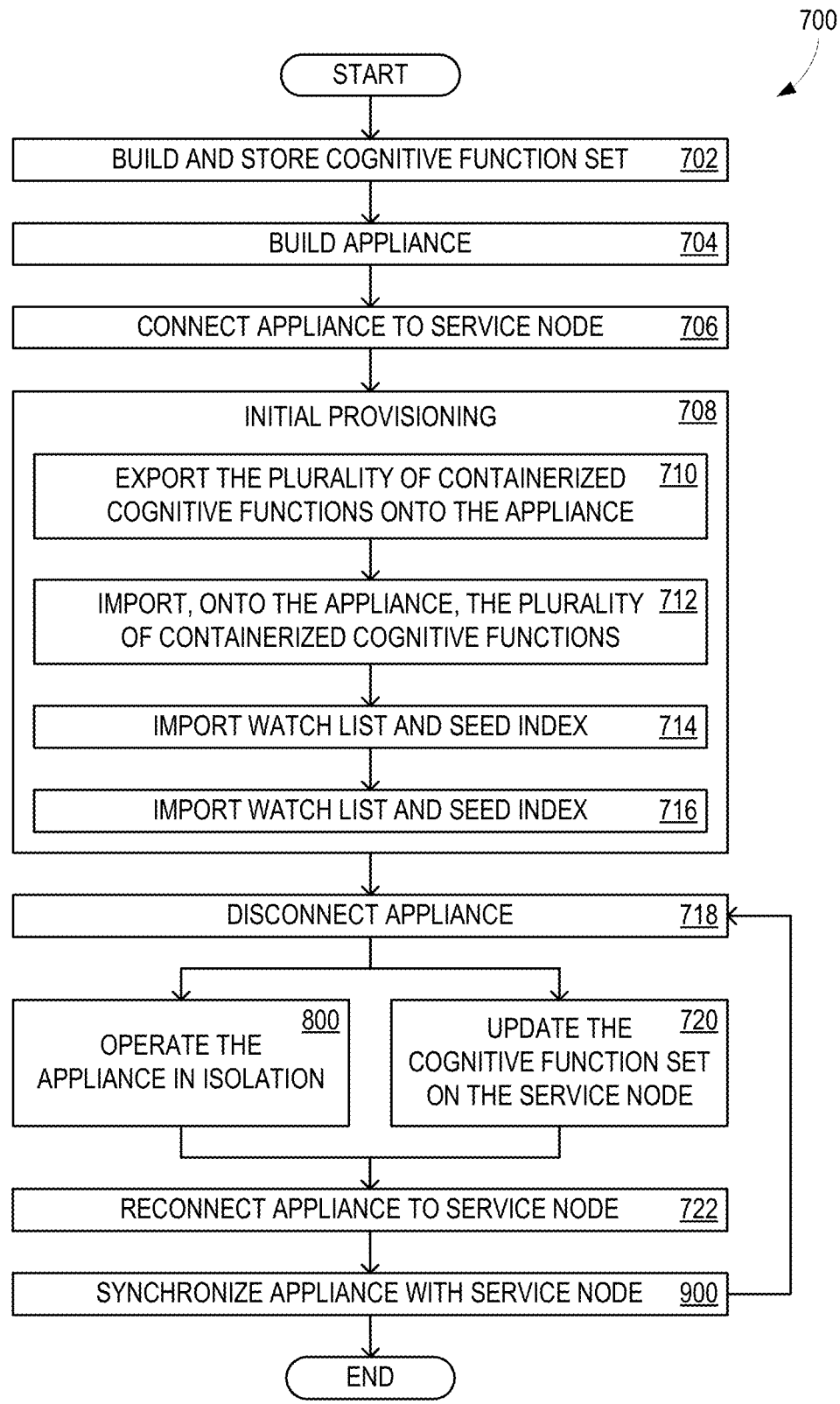
FIG. 7 is a flow chart illustrating exemplary operations involved in preloading or provisioning an appliance.

FIG. 7 is a flow chart 700 illustrating exemplary operations involved in preloading or provisioning appliance 102. Operation 702 includes building and storing a cognitive function set on a service node, and operation 704 includes building the appliance (e.g., appliance 102). The appliance is initially connected to the service node in operation 706. Operation 708 is the initial provisioning, which includes operations 710-716. Operation 710 is the service node side and includes exporting the plurality of containerized cognitive functions onto the appliance from the stored cognitive function set. Operation 712 is the appliance side of operation 710, and includes importing, onto the appliance, a plurality of containerized cognitive functions from the service node, when the appliance is initially connected to a network. Operation 714 includes importing, onto the appliance a seed index from the service node, and operation 716 include importing, by the appliance, a watch list from the service node.

The appliance is disconnected from the service node in operation 718. The appliance operates in isolation, according to a flow chart 800 of FIG. 8. In parallel, operation 720 includes updating the cognitive function set within the stored cognitive function set on the service node. The appliance is reconnected to the service node in operation 722, for synchronization with the service node and configuration for the next mission, according to flow chart 900 of FIG. 9. When synchronization is complete, the appliance is disconnected again in operation 718.

Figure 8:
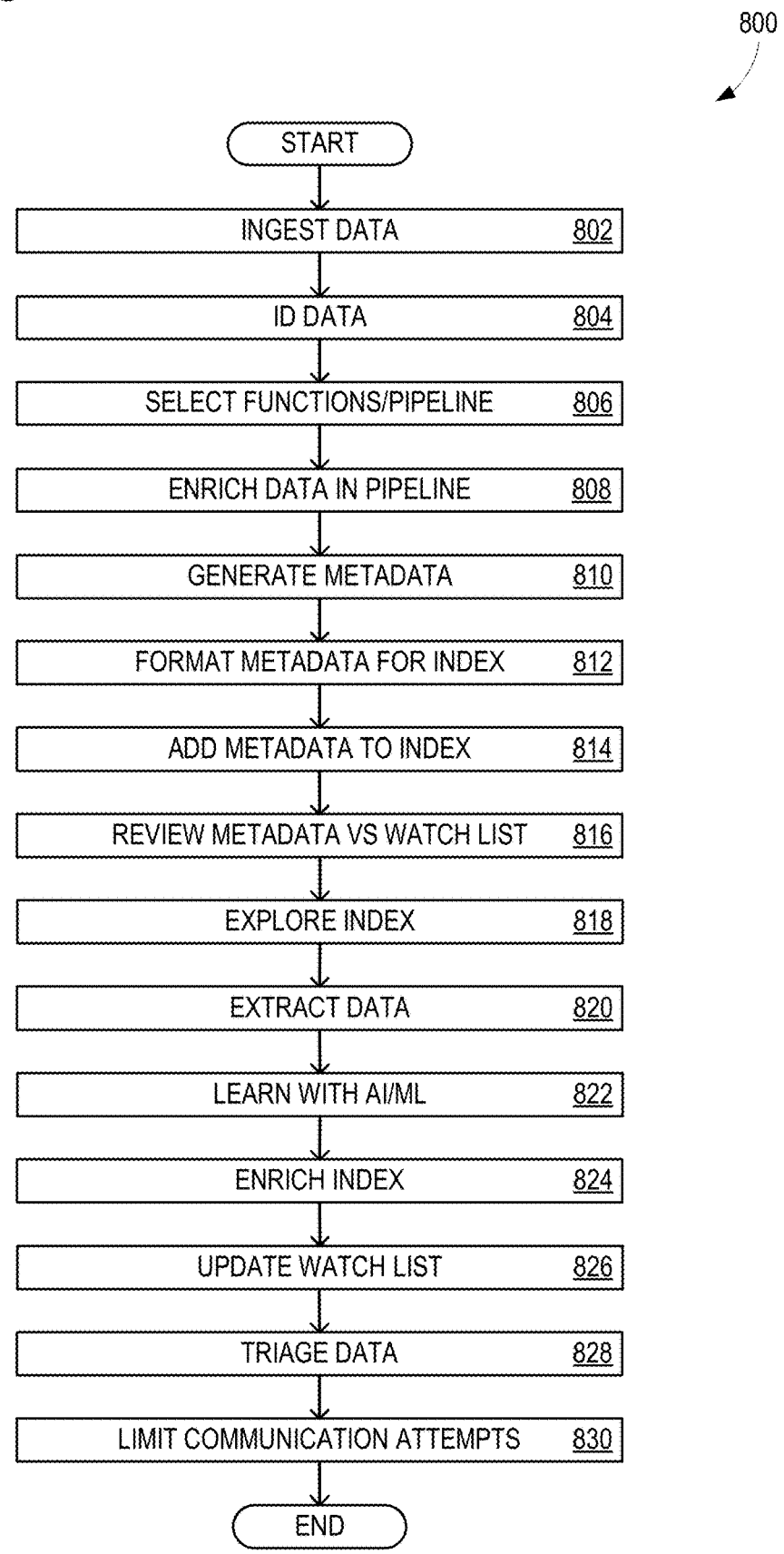
FIG. 8 is a flow chart illustrating exemplary operations involved in using an appliance in isolation.

FIG. 8 is a flow chart 800 illustrating exemplary operations involved in using appliance 102 in isolation, for example in the field. Appliance 102 ingests data in operation 802. Operation 802 includes ingesting, by the appliance, data of a first type from a first data source coupled to the appliance (e.g., one or more of sensor 164, memory device 166, and computing node 168 of FIG. 1). Operation 802 also includes ingesting, by the appliance, data of a second type from a second data source coupled to the appliance. Because different pipelines and cognitive functions operate on different data types, operation 804 identifies the data type. Based on the data type, a specific function or pipeline is selected in operation 806 and is used for enriching the data in operation 808. Some data types are not suitable for the set of on-board cognitive functions. So, in some examples, operation 806 further identifies, on the appliance, at least a second portion of the ingested data for enrichment by a cognitive function that is not within the plurality of containerized cognitive functions.

Operation 808 includes enriching, on the appliance, at least a first portion of the ingested data, when the appliance is in a disconnected state, with at least one of the cognitive functions of the plurality of containerized cognitive functions. In some examples, a first cognitive function pipeline processes the ingested data of the first type. In some examples, the first cognitive function pipeline includes at least a first cognitive function of the plurality of containerized cognitive functions. In some examples, wherein a second cognitive function pipeline processes the ingested data of the second type. In some examples, the second cognitive function pipeline includes at least a second cognitive function of the plurality of containerized cognitive functions, and the second cognitive function is a different cognitive function than the first cognitive function. In some examples, a first cognitive function includes a CV OCR and a second cognitive function includes a machine translation operation to translate the OCR'd text to a different language.

This generates metadata (e.g., metadata 122) in operation 810, which is formatted for the index 124 in operation 812. The formatted metadata is added to the index in operation 814, which includes storing, on the appliance, the enriched data in an index. The formatted metadata is reviewed against the watch list in operation 816, by determining, on the appliance, whether a portion of the enriched data includes any data items within the watch list. Also, the index is explored (searched) directly, in operation 818. When either a search of the index or a review against the watch list produces a search hit, operation 820 extracts data from the data store. The extracted data (along with other data, for example other data also extracted with the same search term) is used with AI/ML to perform on-board learning in operation 822. This is used to further enrich the index in operation 824. That is, operation 824 includes growing, on the appliance, an initially-loaded seed index into an enhanced index with the enriched data. The extracted data is also used to update the watch list in operation 826. Data is triaged in operation 828 for the next uploading or synchronization opportunity, including, for example, data store 120, index 124, manifest 134, data log 128, and watch list 126. Operation 828 includes triaging, on the appliance, the ingested data and the enriched data in the index for uploading. In some examples, based at least on determining that the portion of the enriched data includes a data item within the watch list, triaging the ingested data includes prioritizing the portion of the enriched data for further enrichment on the appliance. Operation 830 includes limiting, by the appliance, communication attempts based at least on a communication profile.

Figure 9:
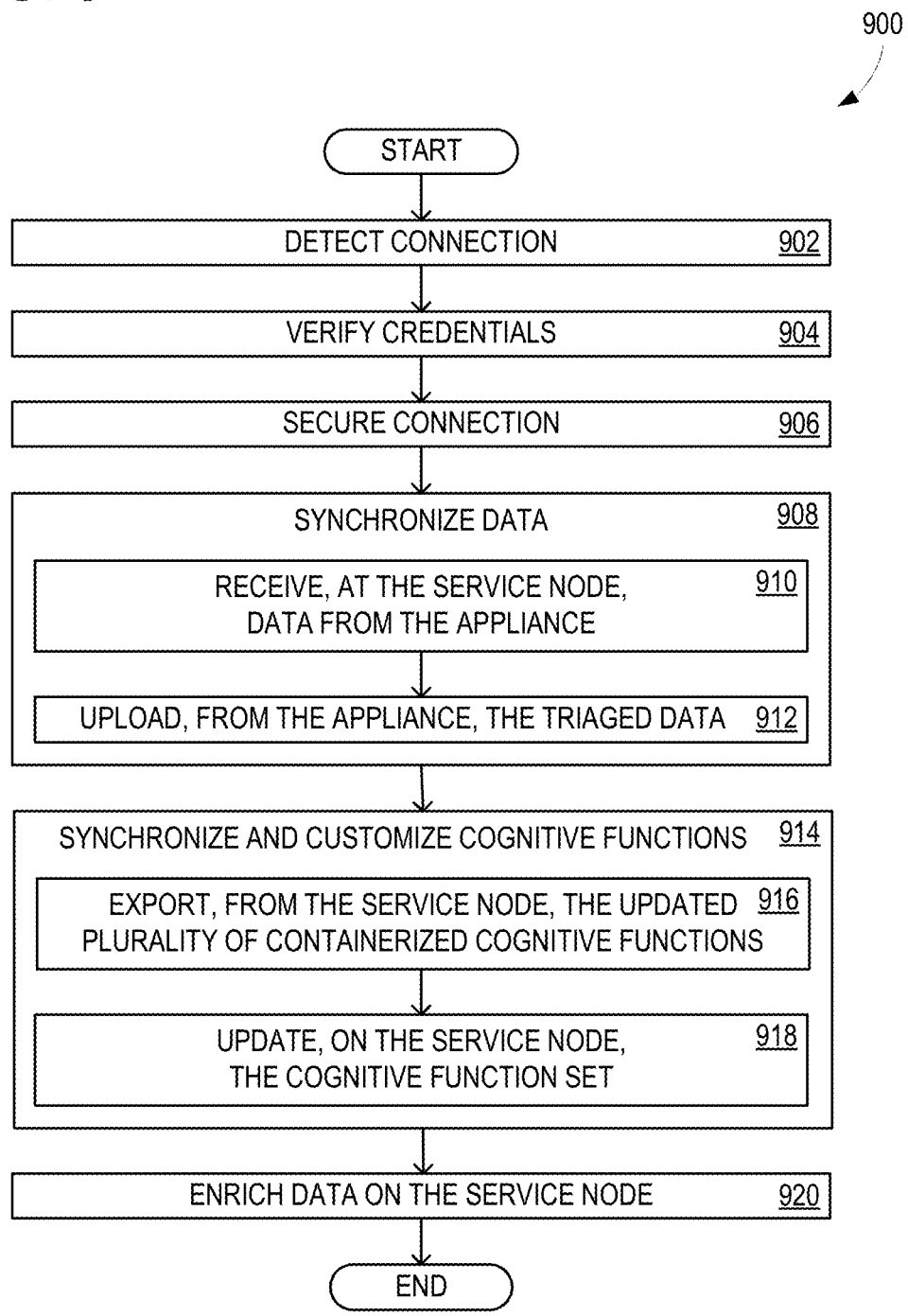
FIG. 9 is a flow chart illustrating exemplary operations involved in synchronizing an appliance.

FIG. 9 is a flow chart 900 illustrating exemplary operations involved in synchronizing appliance 102 with a service node. Operation 902 includes detecting the network connection that was created in operation 722 of FIG. 7, and operation 904 includes each node verifying the credentials of the other node. That is, the appliance limits access to other nodes based on credentials of the endpoint and pathways. A secure connection is created in operation 906, for example using encryption and/or authentication schemes. Operation 908 includes synchronizing data (bi-directionally) and includes operations 910 and 912. Operation 910 is the service side operation, and includes receiving, at the service node, data from the appliance when the appliance is reconnected to the service node. The uploading proceeds according to the order reflected in the queue that had been created when the appliance was operating in isolation. Operation 912 is the appliance side operation, and includes uploading, from the appliance, the triaged data when reconnected to a network.

Operation 914 includes synchronizing (bi-directionally) and customizing cognitive functions for deployment on the appliance's next mission. Operation 914 includes operations 916 and 918. Operation 916 is the service side operation, and includes exporting, from the service node, the updated plurality of containerized cognitive functions onto the appliance from the updated stored cognitive function set. Operation 918 is the appliance side operation, and includes updating, on the service node, the cognitive function set within the stored cognitive function set with at least one of the cognitive functions of the plurality of containerized cognitive functions on the appliance. Operation 920 then includes enriching the second portion of the ingested data with a cognitive function on the service node.

Additional Examples

Some aspects and examples disclosed herein are directed to a system for data enrichment on insulated appliances comprising: an appliance for performing knowledge mining in a disconnected state, the appliance having customized containerized cognitive functions, and operable to triage data for upload when connected.

Some aspects and examples disclosed herein are directed to a system for data enrichment on insulated appliances comprising: an appliance for performing knowledge mining in a disconnected state, wherein the appliance is operative to: import a plurality of containerized cognitive functions and a seed index from a service node, when the appliance is initially connected to a network; ingest data of a first type from a first data source coupled to the appliance; enrich at least a first portion of the ingested data, when in the disconnected state, with at least one of the cognitive functions of the plurality of containerized cognitive functions; identify at least a second portion of the ingested data for enrichment by a cognitive function that is not within the plurality of containerized cognitive functions; based at least on knowledge extracted from the enriched data, further the enrich the enriched data; and grow the seed index into an enhanced index with the enriched data.

Some aspects and examples disclosed herein are directed to a system for data enrichment on insulated appliances comprising: an appliance for performing knowledge mining in a disconnected state, wherein the appliance is operative to: ingest data of a first type from a first data source coupled to the appliance; enrich at least a first portion of the ingested data, when in the disconnected state, with at least one of the cognitive functions of the plurality of containerized cognitive functions; identify at least a second portion of the ingested data for enrichment by a cognitive function that is not within the plurality of containerized cognitive functions; store the enriched data in an index; triage the ingested data and the enriched data in the index for uploading; upload the triaged data when reconnected to a network; and import an updated plurality of containerized cognitive functions when reconnected.

Some aspects and examples disclosed herein are directed to a method of data enrichment on insulated appliances comprising: importing, onto an appliance, a plurality of containerized cognitive functions and a seed index from a service node, when the appliance is initially connected to a network; ingesting, by the appliance, data of a first type from a first data source coupled to the appliance; enriching, on the appliance, at least a first portion of the ingested data, when the appliance is in a disconnected state, with at least one of the cognitive functions of the plurality of containerized cognitive functions; identifying, on the appliance, at least a second portion of the ingested data for enrichment by a cognitive function that is not within the plurality of containerized cognitive functions; based at least on knowledge extracted from the enriched data, further the enriching the enriched data on the appliance; and growing, on the appliance, the seed index into an enhanced index with the enriched data.

Some aspects and examples disclosed herein are directed to a method of data enrichment on insulated appliances comprising: ingesting, by an appliance, data of a first type from a first data source coupled to the appliance; enriching, on the appliance, at least a first portion of the ingested data, when the appliance is in a disconnected state, with at least one cognitive functions of a plurality of containerized cognitive functions; identifying, on the appliance, at least a second portion of the ingested data for enrichment by a cognitive function that is not within the plurality of containerized cognitive functions; storing, on the appliance, the enriched data in an index; triaging, on the appliance, the ingested data and the enriched data in the index for uploading; uploading, from the appliance, the triaged data when reconnected to a network; and importing, onto the appliance, an updated plurality of containerized cognitive functions when reconnected.

Some aspects and examples disclosed herein are directed to one or more computer storage devices having computer-executable instructions stored thereon for data enrichment on insulated appliances, which, on execution by a computer, cause the computer to perform operations comprising: importing, onto an appliance, a plurality of containerized cognitive functions, a seed index, and a watch list from a service node, when the appliance is initially connected to a network, wherein the appliance comprises a first one of the one or more computer storage devices, and wherein the plurality of containerized cognitive functions comprises at least two cognitive functions selected from the list consisting of: computer vision (CV), speech recognition, text analytics, translation, and facial recognition; ingesting, by the appliance, data of a first type from a first data source coupled to the appliance, wherein a first cognitive function pipeline processes the ingested data of the first type, and wherein the first cognitive function pipeline includes at least a first cognitive function of the plurality of containerized cognitive functions; ingesting, by the appliance, data of a second type from a second data source coupled to the appliance, wherein a second cognitive function pipeline processes the ingested data of the second type, and wherein the second cognitive function pipeline includes at least a second cognitive function of the plurality of containerized cognitive functions, wherein the second cognitive function is a different cognitive function than the first cognitive function, and wherein at least one of the first cognitive function pipeline and the second cognitive function pipeline includes a plurality of cognitive functions; enriching, on the appliance, at least a first portion of the ingested data, when the appliance is in a disconnected state, with at least one of the cognitive functions of the plurality of containerized cognitive functions; identifying, on the appliance, at least a second portion of the ingested data for enrichment by a cognitive function that is not within the plurality of containerized cognitive functions; training, on the appliance, at least one of the cognitive functions of the plurality of containerized cognitive functions with synthetic data; determining, on the appliance, whether a portion of the enriched data includes any data items within the watch list; and based at least on determining that the portion of the enriched data includes a data item within the watch list, prioritizing the portion of the enriched data for further enrichment on the appliance; based at least on the prioritizing and knowledge extracted from the enriched data, further the enriching the enriched data on the appliance; and growing, on the appliance, the seed index into an enhanced index with the enriched data.

Some aspects and examples disclosed herein are directed to one or more computer storage devices having computer-executable instructions stored thereon for data enrichment on insulated appliances, which, on execution by a computer, cause the computer to perform operations comprising: ingesting, by an appliance, data of a first type from a first data source coupled to the appliance; ingesting, by the appliance, data of a second type from a second data source coupled to the appliance, wherein at least one of the first data source coupled to the appliance and the second data source coupled to the appliance comprises a sensor on the appliance; enriching, on the appliance, at least a first portion of the ingested data, when the appliance is in a disconnected state, with at least one cognitive functions of a plurality of containerized cognitive functions, wherein a first cognitive function pipeline processes the ingested data of the first type, wherein the first cognitive function pipeline includes at least a first cognitive function of the plurality of containerized cognitive functions, wherein a second cognitive function pipeline processes the ingested data of the second type, wherein the second cognitive function pipeline includes at least a second cognitive function of the plurality of containerized cognitive functions, wherein the second cognitive function is a different cognitive function than the first cognitive function, wherein at least one of the first cognitive function pipeline and the second cognitive function pipeline includes a plurality of cognitive functions, and wherein the plurality of containerized cognitive functions comprises at least two cognitive functions selected from the list consisting of: computer vision (CV), speech recognition, text analytics, translation, and facial recognition; identifying, on the appliance, at least a second portion of the ingested data for enrichment by a cognitive function that is not within the plurality of containerized cognitive functions; storing, on the appliance, the enriched data in an index; determining, by the appliance, whether the enriched data corresponds to any data items within a watch list; triaging, on the appliance, the ingested data and the enriched data in the index for uploading, wherein triaging the ingested data and the enriched data in the index for uploading comprises prioritizing enriched data corresponding to items within the watch list; uploading, from the appliance, the triaged data when reconnected to a network; importing, onto the appliance, an updated plurality of containerized cognitive functions when reconnected to the network, wherein the updated plurality of containerized cognitive functions includes at least one cognitive function that is operative to enrich the second portion of the ingested data; communicating, by the appliance, with a second appliance to import or export data or a cognitive function; limiting, by the appliance, limit communication attempts based at least on a communication profile; and when connected, limiting, by the appliance, communication based on credentials of a connected node.

Alternatively, or in addition to the other examples described herein, examples include any combination of the following:

- the plurality of containerized cognitive functions comprises at least two cognitive functions selected from the list consisting of: CV, speech recognition, text analytics, translation, and facial recognition;
- at least one of the first cognitive function pipeline and the second cognitive function pipeline includes a plurality of cognitive functions;
- the appliance further comprises an ML component operative to train at least one of the cognitive functions of the plurality of containerized cognitive functions with synthetic data;

the first data source coupled to the appliance comprises a sensor on the appliance;

from a service node storing a cognitive function set, exporting the plurality of containerized cognitive functions onto the appliance from the stored cognitive function set; updating the cognitive function set within the stored cognitive function set after the appliance has disconnected from the service node and while the appliance remains disconnected from the service node; receiving, at the service node, data from the appliance when the appliance is reconnected to the service node; and exporting, from the service node, the updated plurality of containerized cognitive functions onto the appliance from the updated stored cognitive function set, when the appliance is reconnected to the service node;

enriching the second portion of the ingested data with a cognitive function on the service node;

ingesting, by the appliance, data of a second type from a second data source coupled to the appliance; wherein a first cognitive function pipeline processes the ingested data of the first type, wherein the first cognitive function pipeline includes at least a first cognitive function of the plurality of containerized cognitive functions, wherein a second cognitive function pipeline processes the ingested data of the second type, wherein the second cognitive function pipeline includes at least a second cognitive function of the plurality of containerized cognitive functions, and wherein the second cognitive function is a different cognitive function than the first cognitive function;

at least one of the first cognitive function pipeline and the second cognitive function pipeline includes a plurality of cognitive functions, and at least one of the first data source coupled to the appliance and the second data source coupled to the appliance comprises a sensor on the appliance;

importing, by the appliance, a watch list from the service node when the appliance is initially connected to a network; determining, on the appliance, whether a portion of the enriched data includes any data items within the watch list; and based at least on determining that the portion of the enriched data includes a data item within the watch list, prioritizing the portion of the enriched data for further enrichment on the appliance;

updating, on the service node, the cognitive function set within the stored cognitive function set with at least one of the cognitive functions of the plurality of containerized cognitive functions on the appliance;

the updated plurality of containerized cognitive functions includes at least one cognitive function that is operative to enrich the second portion of the ingested data;

communicating, by the appliance, with a second appliance to import or export data or a cognitive function;

limiting, by the appliance, communication attempts based at least on a communication profile; and when connected, limiting, by the appliance, communication based on credentials of a connected node;

determining, by the appliance, whether the enriched data corresponds to any data items within a watch list, wherein triaging the ingested data and the enriched data in the index for uploading comprises prioritizing enriched data corresponding to items within the watch list;

bi-directional updates of data and functionality;

intelligent pre-loading of data, skills (functions), seed index, and/or a tip list;

waking up different containers or functions (skills) as data is loaded;

queue data according to priority for upload;

upload and download intelligently based on customer need;

customer need is inferred by the system;

functions are customizable with third party skills;

ML models can be trained using synthetic data in a disconnected state; and the appliance is preloaded with functions and data;

While the aspects of the disclosure have been described in terms of various examples with their associated operations, a person skilled in the art would appreciate that a combination of operations from any number of different examples is also within scope of the aspects of the disclosure.

Example Operating Environment

Figure 10:
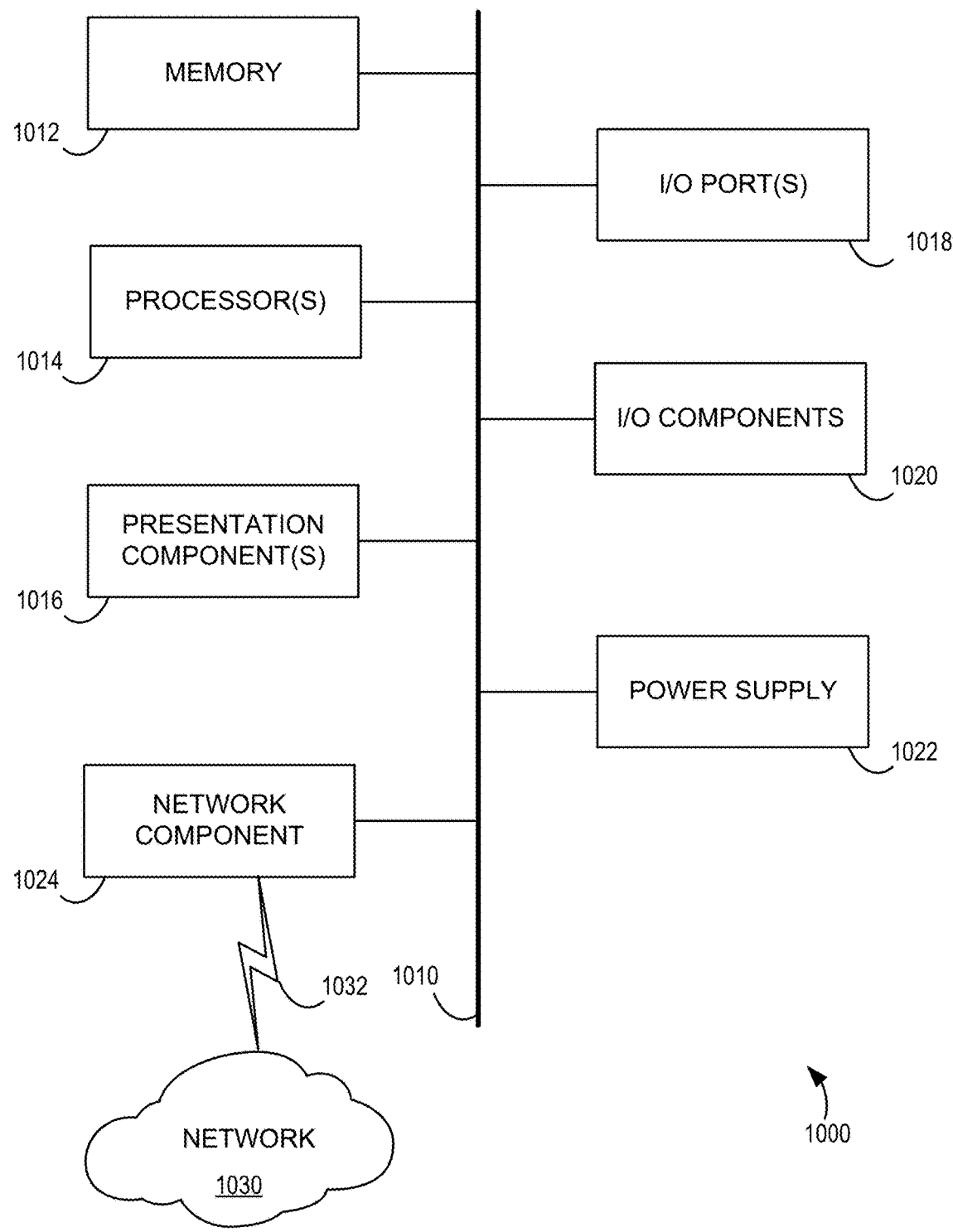
FIG. 10 is a block diagram of an example computing environment suitable for implementing some of the various examples disclosed herein.

FIG. 10 is a block diagram of an example computing device 1000 for implementing aspects disclosed herein and is designated generally as computing device 1000. Computing device 1000 is but one example of a suitable computing environment and is not intended to suggest any limitation as to the scope of use or functionality of the examples disclosed herein. Neither should the computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer-storage memory 1012, one or more processors 1014, one or more presentation components 1016, I/O ports 1018, I/O components 1020, a power supply 1022, and a network component 1024. While computer device 1000 is depicted as a seemingly single device, multiple computing devices 1000 may work together and share the depicted device resources. For instance, computer-storage memory 1012 may be distributed across multiple devices, processor(s) 1014 may be provided or housed on different devices, and so on.

Bus 1010 represents what may be one or more busses (such as an address bus, data bus, or a combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 10 is merely illustrative of an exemplary computing device that can be used in connection with one or more disclosed examples. Distinction is not made between such categories as "workstation," "server," "laptop," "hand-held device," etc., as all are contemplated within the scope of FIG. 10 and the references herein to a "computing device." Computer-storage memory 1012 may take the form of the computer-storage media references below and operatively provide storage of computer-readable instructions, data structures, program modules and other data for the computing device 1000. For example, computer-storage memory 1012 may store an operating system, a universal application platform, or other program modules and program data. Computer-storage memory 1012 may be used to store and access instructions configured to carry out the various operations disclosed herein.

As mentioned below, computer-storage memory 1012 may include computer-storage media in the form of volatile and/or nonvolatile memory, removable or non-removable memory, data disks in virtual environments, or a combination thereof. And computer-storage memory 1012 may include any quantity of memory associated with or accessible by the computing device 1000. Memory 1012 may be internal to the computing device 1000 (as shown in FIG. 10), external to the computing device 1000 (not shown), or both (not shown). Examples of memory 1012 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 1000. Additionally, or alternatively, the computer-storage memory 1012 may be distributed across multiple computing devices 1000, e.g., in a virtualized environment in which instruction processing is carried out on multiple devices 1000. For the purposes of this disclosure, "computer storage media," "computer-storage memory," "memory," and "memory devices" are synonymous terms for the computer-storage memory 1012, and none of these terms include carrier waves or propagating signaling.

Processor(s) 1014 may include any quantity of processing units that read data from various entities, such as memory 1012 or I/O components 1020. Specifically, processor(s) 1014 are programmed to execute computer-executable instructions for implementing aspects of the disclosure, and in some examples include FPGAs. The instructions may be performed by the processor, by multiple processors within the computing device 1000, or by a processor external to the client computing device 1000. In some examples, the processor(s) 1014 are programmed to execute instructions such as those illustrated in the flow charts discussed below and depicted in the accompanying drawings. Moreover, in some examples, the processor(s) 1014 represent an implementation of analog techniques to perform the operations described herein. For example, the operations may be performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. Ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

Computing device 1000 may operate in a networked environment via the network component 1024 using logical connections to one or more remote computers. In some examples, the network component 1024 includes a network interface card and/or computer-executable instructions (e.g., a driver) for operating the network interface card. Communication between the computing device 1000 and other devices may occur using any protocol or mechanism over any wired or wireless connection. In some examples, the network component 1024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. For example, network component 1024 communicates over communication link 1032 with network 1030.

Although described in connection with an example computing device 1000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for data enrichment on insulated appliances, the system comprising:
   an appliance for performing knowledge mining in a disconnected state, wherein the appliance is operative to:
      ingest data of a first type from a first data source coupled to the appliance;
      enrich at least a first portion of the ingested data, in the disconnected state, with a first cognitive function of a plurality of containerized cognitive functions, wherein the plurality of containerized cognitive functions run on-board the appliance;
      identify a second portion of the ingested data that is not suitable for enrichment by the plurality of containerized cognitive functions on-board the appliance;
      store the enriched data in an index;
      update the plurality of containerized cognitive functions in the disconnected state;
      identify a portion of the enriched data that corresponds to data items within a watch list;
      triage the ingested data and the enriched data in the index for uploading, wherein the triaging comprises prioritizing the identified portion of the enriched data for the uploading;
      upload the triaged data based on priority indicated by the watch list when reconnected to a cloud service node, wherein the identified portion of the enriched data is uploaded first;
      upload an updated containerized cognitive function of the plurality of containerized cognitive functions to the cloud service node, wherein the updated containerized cognitive function further updates one or more trained cognitive functions stored on the cloud service node;
      import the updated one or more trained cognitive functions from the cloud service node when reconnected; and
      enrich the identified second portion of the ingested data using the updated one or more trained cognitive functions, wherein the updated one or more trained cognitive functions are selected from a list consisting of:
         computer vision (CV), speech recognition, text analytics, translation, facial recognition, anomaly detection, and clustering.

2. The system of claim 1, wherein the list further consists: language detection and contextual analysis.

3. The system of claim 1 further comprising:
   the cloud service node storing the one or more trained cognitive functions, wherein the cloud service node is operative to:
      export the plurality of containerized cognitive functions onto the appliance from the stored one or more trained cognitive functions;
      update the one or more trained cognitive functions after the appliance has disconnected from the cloud service node and while the appliance remains disconnected from the cloud service node;
      receive data from the appliance when the appliance is reconnected to the cloud service node; and
      export the updated plurality of containerized cognitive functions onto the appliance from the updated stored one or more trained cognitive functions when the appliance is reconnected to the cloud service node.

4. The system of claim 3 wherein the appliance is further operative to:
   document in log data the identification of the second portion of the ingested data; and
   trigger a request for new cognitive functionality based on the log data.

5. The system of claim 1 wherein the appliance is further operative to:
   record a specific cognitive function of the plurality of containerized cognitive functions in a manifest, wherein the specific cognitive function is associated with a gap in the index; and
   upload the manifest to the cloud service node when reconnected to the cloud service node.

6. The system of claim 1 wherein the appliance is further operative to:
communicate with a second appliance to import or export data or a cognitive function.

7. The system of claim 1 wherein the appliance is further operative to:
limit communication attempts based at least on a communication profile, the communication profile comprising defined conditions under which the appliance is allowed to attempt network connections; and
when connected, limit communication based on credentials of a connected node.

8. The system of claim 1 wherein the appliance is further operative to:
enrich the second portion of the ingested data by the second cognitive function, wherein enriching at least the first portion of the ingested data comprises extracting metadata from the first portion of the ingested data using the first cognitive function, and wherein enriching the second portion of the ingested data comprises extracting additional metadata from the second portion of the ingested data by the second cognitive function.

9. The system of claim 1 wherein the appliance is further operative to:
ingest data of a second type from a second data source coupled to the appliance;
wherein a first cognitive function pipeline processes the ingested data of the first type,
wherein the first cognitive function pipeline includes at least the first cognitive function of the plurality of containerized cognitive functions,
wherein a second cognitive function pipeline processes the ingested data of the second type,
wherein the second cognitive function pipeline includes at least a second cognitive function of the plurality of containerized cognitive functions,
wherein the second cognitive function is a different cognitive function than the first cognitive function,
wherein at least one of the first cognitive function pipeline and the second cognitive function pipeline includes a plurality of cognitive functions, and
wherein at least one of the first data source coupled to the appliance and the second data source coupled to the appliance comprises a sensor on the appliance.

10. A method of data enrichment on insulated appliances, the method comprising:
ingesting, by an appliance, data of a first type from a first data source coupled to the appliance;
enriching, on the appliance, at least a first portion of the ingested data, when the appliance is in a disconnected state, with a first cognitive function of a plurality of containerized cognitive functions, wherein the plurality of containerized cognitive functions run on-board the appliance;
identifying, on the appliance, a second portion of the ingested data that is not suitable for enrichment by the plurality of containerized cognitive functions on-board the appliance;
storing, on the appliance, the enriched data in an index;
updating the plurality of containerized cognitive functions in the disconnected state;
identify a portion of the enriched data that corresponds to data items within a watch list;
triaging, on the appliance, the ingested data and the enriched data in the index for uploading, wherein the triaging comprises prioritizing the identified portion of the enriched data for the uploading;
uploading, from the appliance, the triaged data based on priority indicated by the watch list when reconnected to a cloud service node, wherein the identified portion of the enriched data is uploaded first;
uploading an updated containerized cognitive function of the plurality of containerized cognitive functions to the cloud service node, wherein the updated containerized cognitive function further updates one or more trained cognitive functions stored on the cloud service node;
importing, onto the appliance, the updated one or more trained cognitive functions from the cloud service node when reconnected; and
enriching the identified second portion of the ingested data using the updated one or more trained cognitive functions, wherein the updated one or more trained cognitive functions are selected from a list consisting of:
computer vision (CV), speech recognition, text analytics, translation, facial recognition, anomaly detection, and clustering.

11. The method of claim 10, wherein the list further consists of:
language detection and contextual analysis.

12. The method of claim 10 further comprising:
from the cloud service node storing the one or more trained cognitive functions, exporting the plurality of containerized cognitive functions onto the appliance from the stored one or more trained cognitive functions;
updating the one or more trained cognitive functions after the appliance has disconnected from the cloud service node and while the appliance remains disconnected from the cloud service node;
receiving, at the cloud service node, data from the appliance when the appliance is reconnected to the cloud service node; and
exporting, from the cloud service node, the updated plurality of containerized cognitive functions onto the appliance from the updated stored one or more trained cognitive functions, when the appliance is reconnected to the cloud service node.

13. The method of claim 12 further comprising:
documenting in log data the identification of the second portion of the ingested data; and
triggering a request for new cognitive functionality based on the log data.

14. The method of claim 10, further comprising:
recording a specific cognitive function of the plurality of containerized cognitive functions in a manifest, wherein the specific cognitive function is associated with a gap in the index; and
uploading the manifest to the cloud service node when reconnected to the cloud service node.

15. The method of claim 10 further comprising:
communicating, by the appliance, with a second appliance to import or export data or a cognitive function.

16. The method of claim 10 further comprising:
limiting, by the appliance, communication attempts based at least on a communication profile, the communication profile comprising defined conditions under which the appliance is allowed to attempt network connections; and
when connected, limiting, by the appliance, communication based on credentials of a connected node.

17. The method of claim 10 further comprising:
enriching the second portion of the ingested data by the second cognitive function, wherein enriching at least the first portion of the ingested data comprises extracting metadata from the first portion of the ingested data using the first cognitive function, and wherein enriching the second portion of the ingested data comprises extracting additional metadata from the second portion of the ingested data by the second cognitive function.

18. The method of claim 10 further comprising:
ingesting, by the appliance, data of a second type from a second data source coupled to the appliance;
wherein a first cognitive function pipeline processes the ingested data of the first type,
wherein the first cognitive function pipeline includes at least the first cognitive function of the plurality of containerized cognitive functions,
wherein a second cognitive function pipeline processes the ingested data of the second type,
wherein the second cognitive function pipeline includes at least a second cognitive function of the plurality of containerized cognitive functions,
wherein the second cognitive function is a different cognitive function than the first cognitive function,
wherein at least one of the first cognitive function pipeline and the second cognitive function pipeline includes a plurality of cognitive functions, and
wherein at least one of the first data source coupled to the appliance and the second data source coupled to the appliance comprises a sensor on the appliance.

19. One or more computer storage devices having computer-executable instructions stored thereon for data enrichment on insulated appliances, which, on execution by a computer, cause the computer to perform operations comprising:
ingesting, by an appliance, data of a first type from a first data source coupled to the appliance;
ingesting, by the appliance, data of a second type from a second data source coupled to the appliance, wherein at least one of the first data source coupled to the appliance and the second data source coupled to the appliance comprises a sensor on the appliance;
enriching, on the appliance, at least a first portion of the ingested data, when the appliance is in a disconnected state, with at least one cognitive functions of a plurality of containerized cognitive functions, wherein the plurality of containerized cognitive functions run on-board the appliance,
wherein a first cognitive function pipeline processes the ingested data of the first type,
wherein the first cognitive function pipeline includes at least a first cognitive function of the plurality of containerized cognitive functions,
wherein a second cognitive function pipeline processes the ingested data of the second type,
wherein the second cognitive function pipeline includes at least a second cognitive function of the plurality of containerized cognitive functions,
wherein the second cognitive function is a different cognitive function than the first cognitive function, and
wherein at least one of the first cognitive function pipeline and the second cognitive function pipeline includes a plurality of cognitive functions;
identifying, on the appliance, a second portion of the ingested data that is not suitable for enrichment by the plurality of containerized cognitive functions on-board the appliance;

storing, on the appliance, the enriched data in an index;
updating the plurality of containerized cognitive functions in the disconnected state;
identifying, by the appliance, a portion of the enriched data that corresponds to data items within a watch list;
triaging, on the appliance, the ingested data and the enriched data in the index for uploading, wherein triaging the ingested data and the enriched data in the index for uploading comprises prioritizing the identified portion of the enriched data for the uploading;
uploading, from the appliance, the triaged data based on priority indicated by the watch list when reconnected to a cloud service node, wherein the identified portion of the enriched data is uploaded first;
upload an updated containerized cognitive function of the plurality of containerized cognitive functions to the cloud service node, wherein the updated containerized cognitive function further updates one or more trained cognitive functions stored on the cloud service node;
importing, onto the appliance, the updated one or more trained cognitive functions from the cloud service node;
enriching the identified second portion of the ingested data using the updated one or more trained cognitive functions, wherein the updated one or more trained cognitive functions are selected from a list consisting of:
computer vision (CV), speech recognition, text analytics, translation, facial recognition, anomaly detection, clustering, language detection, and contextual analysis;
communicating, by the appliance, with a second appliance to import or export data or a cognitive function;
limiting, by the appliance, limit communication attempts based at least on a communication profile; and
when connected, limiting, by the appliance, communication based on credentials of a connected node.

20. The one or more computer storage devices of claim 19, wherein the operations further comprise:
from the cloud service node storing the one or more trained cognitive functions, exporting the plurality of containerized cognitive functions onto the appliance from the stored one or more trained cognitive functions;
updating the one or more trained cognitive functions after the appliance has disconnected from the cloud service node and while the appliance remains disconnected from the cloud service node;
receiving, at the cloud service node, data from the appliance when the appliance is reconnected to the cloud service node;
updating, on the cloud service node, the one or more trained cognitive functions with at least one of the cognitive functions of the updated plurality of containerized cognitive functions on the appliance; and
exporting, from the cloud service node, the updated plurality of containerized cognitive functions onto the appliance from the updated stored one or more trained cognitive functions, when the appliance is reconnected to the cloud service node.

* * * * *